UNITED STATES PATENT OFFICE.

WILLIAM AUGUSTUS BURROWS, OF PICCADILLY, ENGLAND.

COMPOSITION FOR THE SOLES OF BOOTS OR SHOES.

SPECIFICATION forming part of Letters Patent No. 431,646, dated July 8, 1890.

Application filed January 28, 1889. Serial No. 297,899. (No specimens.)

*To all whom it may concern:*

Be it known that I, WILLIAM AUGUSTUS BURROWS, a subject of the Queen of Great Britain, residing in Piccadilly, in the county of Middlesex, England, have invented a new and useful Composition for the Soles of Boots or Shoes or other Articles; and I do hereby declare the following to be a full, clear, and exact description of the invention.

The object of this invention is to utilize leather waste in the manufacture of the soles of boots or shoes or other articles. To this end I reduce the leather waste to fine shreds or flock and then mix it with an aqueous solution of gelatine, to which not more than one-tenth per cent. of chrome-alum has been added in order to render the mixture non-absorbent of water when dry.

The mixture while in a damp state is molded or otherwise formed into any desired shape, and when dry is perfectly hard and durable.

Instead of chrome-alum to render the mixture non-absorbent of water, silicate of soda or other silicate or borax may be used for the same purpose, in the following proportions, viz: gelatine, one pound; water, twelve pounds; silicate, six ounces; leather flock, eighteen pounds.

To the above ingredients ordinary acetic acid may be added to harden the composition and make it more durable; but as such addition is not necessary I make no claim thereto.

When the above composition is in its plastic state, a proportion varying from ten to twenty per cent. of fibrous substance—such as jute or tow—may for some purposes be added to it. The said composition, with or without this addition of fibrous material, may be molded into any form desired. For example, door-knobs may be made from it, or the insulating-covering of telegraph-wires; or it may be rolled into sheets and cut into soles and heels for boots or shoes.

What I claim as new, and desire to secure by Letters Patent, is—

The herein-described composition of matter, consisting of leather flock, water, gelatine, and chrome-alum, substantially as set forth.

In testimony that I claim the foregoing I have hereunto set my hand this 4th day of January, 1889.

WILLIAM AUGUSTUS BURROWS.

Witnesses:
ARTHUR E. EDWARDS,
T. G. RIDGEWAY.